US012562314B2

(12) United States Patent
Yamaguchi et al.

(10) Patent No.: US 12,562,314 B2
(45) Date of Patent: Feb. 24, 2026

(54) ELECTRONIC COMPONENT

(71) Applicant: Murata Manufacturing Co., Ltd.,
Nagaokakyo (JP)

(72) Inventors: Shinichi Yamaguchi, Nagaokakyo (JP);
Shoichiro Suzuki, Nagaokakyo (JP)

(73) Assignee: **MURATA MANUFACTURING CO.,
LTD.**, Kyoto (JP)

( * ) Notice: Subject to any disclaimer, the term of this
patent is extended or adjusted under 35
U.S.C. 154(b) by 120 days.

(21) Appl. No.: 18/667,267

(22) Filed: May 17, 2024

(65) Prior Publication Data

US 2024/0304393 A1     Sep. 12, 2024

Related U.S. Application Data

(63) Continuation of application No.
PCT/JP2022/047657, filed on Dec. 23, 2022.

(30) Foreign Application Priority Data

Dec. 28, 2021 (JP) .................................. 2021-214978

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008*
(2013.01); *H01G 4/1227* (2013.01); *H01G
4/129* (2013.01); *H01G 4/232* (2013.01)

(58) Field of Classification Search
CPC ........ H01G 4/30; H01G 4/008; H01G 4/1227;
H01G 4/129; H01G 4/232; H01G 4/0085;
H01G 4/012; H01G 4/12; H01G 4/2325
See application file for complete search history.

(56) References Cited

U.S. PATENT DOCUMENTS 12,198,857 B2 * 1/2025 Doi ......................... H01G 4/012
2013/0319741 A1 * 12/2013 Ahn ...................... H05K 1/0271
361/728

(Continued)

FOREIGN PATENT DOCUMENTS

JP     2019009222 A     1/2019
JP     2019125705 A     7/2019
(Continued)

OTHER PUBLICATIONS

International Search Report in PCT/JP2022/047657, mailed Mar.
14, 2023, 3 pages.

(Continued)

*Primary Examiner* — Dion R. Ferguson
(74) *Attorney, Agent, or Firm* — Keating & Bennett, LLP

(57) ABSTRACT

An electronic component includes first and second inner electrode layers respectively including first and second facing portions and first and second extended portions coupling the first and second facing portions to an outer electrode, the first and second extended portions include a curved portion curving toward a center in a stacking direction with increasing proximity to an end surface from a first or second facing portion side, a solid solution layer includes a first metal component of the inner electrode layers and defines a solid solution with a second metal component at an interface between the curved portion and a dielectric layer, and a mole ratio of the second metal component in the solid solution is about 0.001 or more and about 0.1 or less relative to a total amount of moles of the first and second metal components.

17 Claims, 6 Drawing Sheets

(51) Int. Cl.
    *H01G 4/12*         (2006.01)
    *H01G 4/232*       (2006.01)

(56)           References Cited

U.S. PATENT DOCUMENTS

| | | | | |
|---|---|---|---|---|
| 2015/0116896 | A1* | 4/2015 | Inazuka | H01G 4/30 |
| | | | | 361/301.4 |
| 2015/0155098 | A1* | 6/2015 | Yamaguchi | H01G 13/00 |
| | | | | 156/89.16 |
| 2018/0374643 | A1 | 12/2018 | Inomata et al. | |
| 2019/0221368 | A1* | 7/2019 | Ono | H01G 4/30 |
| 2020/0066452 | A1* | 2/2020 | Cha | H01G 4/30 |
| 2020/0066454 | A1* | 2/2020 | Cha | H01G 4/0085 |
| 2021/0098191 | A1 | 4/2021 | Saito et al. | |
| 2021/0202171 | A1* | 7/2021 | Tsutsui | H01G 4/248 |
| 2021/0202177 | A1 | 7/2021 | Kurosu et al. | |
| 2021/0202179 | A1* | 7/2021 | Saito | H01G 4/12 |
| 2023/0207196 | A1* | 6/2023 | Doi | H01G 4/30 |
| | | | | 174/260 |
| 2024/0274366 | A1* | 8/2024 | Hamada | H01G 4/12 |
| 2024/0304388 | A1* | 9/2024 | Yamaguchi | H01G 4/30 |
| 2024/0304393 | A1* | 9/2024 | Yamaguchi | H01G 4/129 |

FOREIGN PATENT DOCUMENTS

| | | | | |
|---|---|---|---|---|
| JP | 2020031202 A | 2/2020 | | |
| JP | 2021034648 A | 3/2021 | | |
| JP | 2021108360 A | 7/2021 | | |
| WO | WO-2023127643 A1 * | 7/2023 | | H01G 4/1209 |
| WO | WO-2023127732 A1 * | 7/2023 | | H01G 4/12 |
| WO | WO-2023136258 A1 * | 7/2023 | | H01G 4/232 |
| WO | WO-2023189749 A1 * | 10/2023 | | H01G 4/224 |

OTHER PUBLICATIONS

Written Opinion in PCT/JP2022/047657, mailed Mar. 14, 2023, 3 pages.

* cited by examiner

START

CERAMIC GREEN SHEET PRODUCTION STEP ～S1

ONE-SURFACE-SIDE SOLID SOLUTION LAYER PASTE PRINTING STEP ～S2

INNER ELECTRODE LAYER PASTE PRINTING STEP ～S3

OTHER-SURFACE-SIDE SOLID SOLUTION LAYER PASTE PRINTING STEP ～S4

STACKING STEP ～S5

HEAT PRESSURE BONDING STEP ～S6

MOTHER BLOCK CUTTING ～S7

OUTER-ELECTRODE-FORMING STEP ～S8

SINTERING STEP ～S9

END

FIG. 5A
101
FIG. 5B
20P
101
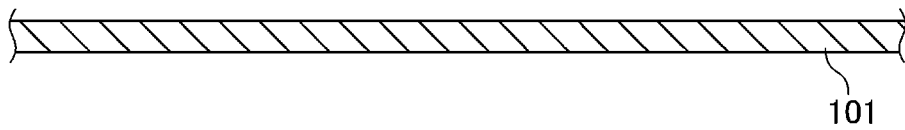
FIG. 5C
P        P
20P        102
102        101
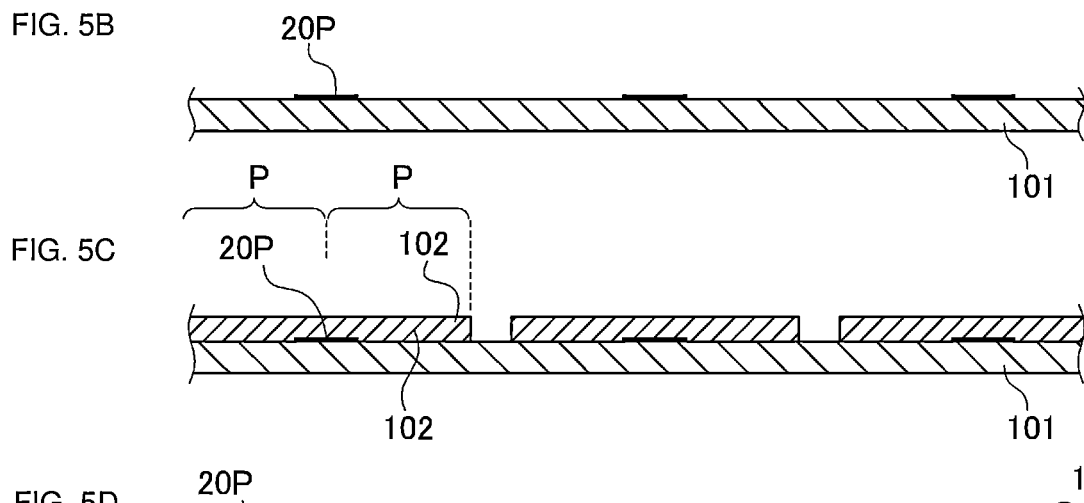
FIG. 5D
20P        103
20P        102        101
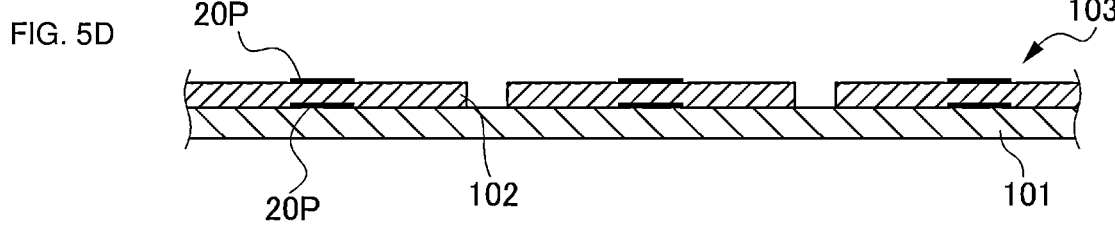

ELECTRONIC COMPONENT

CROSS REFERENCE TO RELATED APPLICATIONS

This application claims the benefit of priority to Japanese Patent Application No. 2021-214978 filed on Dec. 28, 2021 and is a Continuation application of PCT Application No. PCT/JP2022/047657 filed on Dec. 23, 2022. The entire contents of each application are hereby incorporated herein by reference.

BACKGROUND OF THE INVENTION

1. Field of the Invention

The present invention relates to electronic components.

2. Description of the Related Art

For example, an electronic component serving as a multilayer ceramic capacitor includes a multilayer body in which a plurality of dielectric layers and a plurality of inner electrode layers are alternately stacked and two outer electrodes disposed on respective end surfaces located on both sides of the multilayer body in a length direction (see, for example, Japanese Unexamined Patent Application Publication No. 2019-09222).

Such an electronic component is required to have high reliability when a voltage is applied.

SUMMARY OF THE INVENTION

Example embodiments of the present invention provide electronic components each having high reliability when a voltage is applied.

An example embodiment of the present invention provides an electronic component including a multilayer body including a plurality of dielectric layers and a plurality of inner electrode layers that are alternately stacked and two outer electrodes on respective end surfaces located on both sides of the multilayer body in a length direction, wherein the plurality of inner electrode layers include first inner electrode layers and second inner electrode layers alternately provided, each of the first inner electrode layers includes a first facing portion opposing an adjacent one of the second inner electrode layers in a stacking direction and a first extended portion extending from the first facing portion to one of the end surfaces and is coupled to the outer electrode disposed on the one of the end surfaces, and each of the second inner electrode layers includes a second facing portion and a second extended portion extending from the second facing portion to another of the end surfaces and is coupled to the outer electrode on the another of the end surfaces, each of the first and second extended portions includes a curved portion that curves toward a center in the stacking direction with increasing proximity to the end surface from a respective first or second facing portion side, a solid solution layer includes a first metal component as a primary component of the plurality of inner electrode layers and defines a solid solution with a second metal component different from the first metal component and is provided at an interface between the curved portion and the plurality of dielectric layers, and in the solid solution layer, a mole ratio of the second metal component in the solid solution is about 0.001 or more and about 0.1 or less relative to a total amount of moles of the first metal component and the second metal component.

According to example embodiments of the present invention, electronic components each having high reliability when a voltage is applied are provided.

The above and other elements, features, steps, characteristics and advantages of the present invention will become more apparent from the following detailed description of the example embodiments with reference to the attached drawings.

BRIEF DESCRIPTION OF THE DRAWINGS

FIGS. 5A to 5D are diagrams illustrating steps of producing a multilayer sheet 103 in the method for manufacturing the multilayer ceramic capacitor 1.

DETAILED DESCRIPTION OF THE EXAMPLE EMBODIMENTS

Example embodiments of the present invention will be described in detail below with reference to the accompanying drawings.

Figure 1:
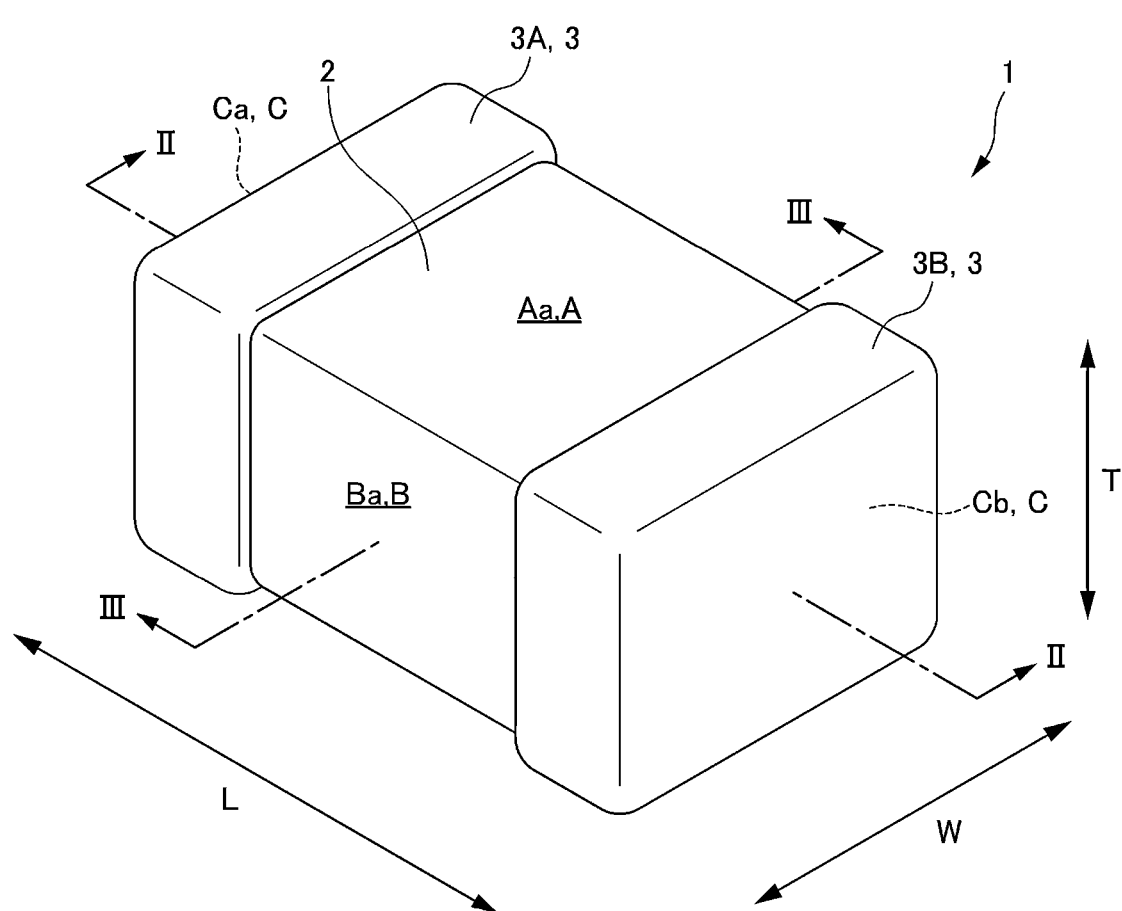
FIG. 1 is a schematic perspective view of a multilayer ceramic capacitor 1 according to an example embodiment of the present invention.
Figure 2:
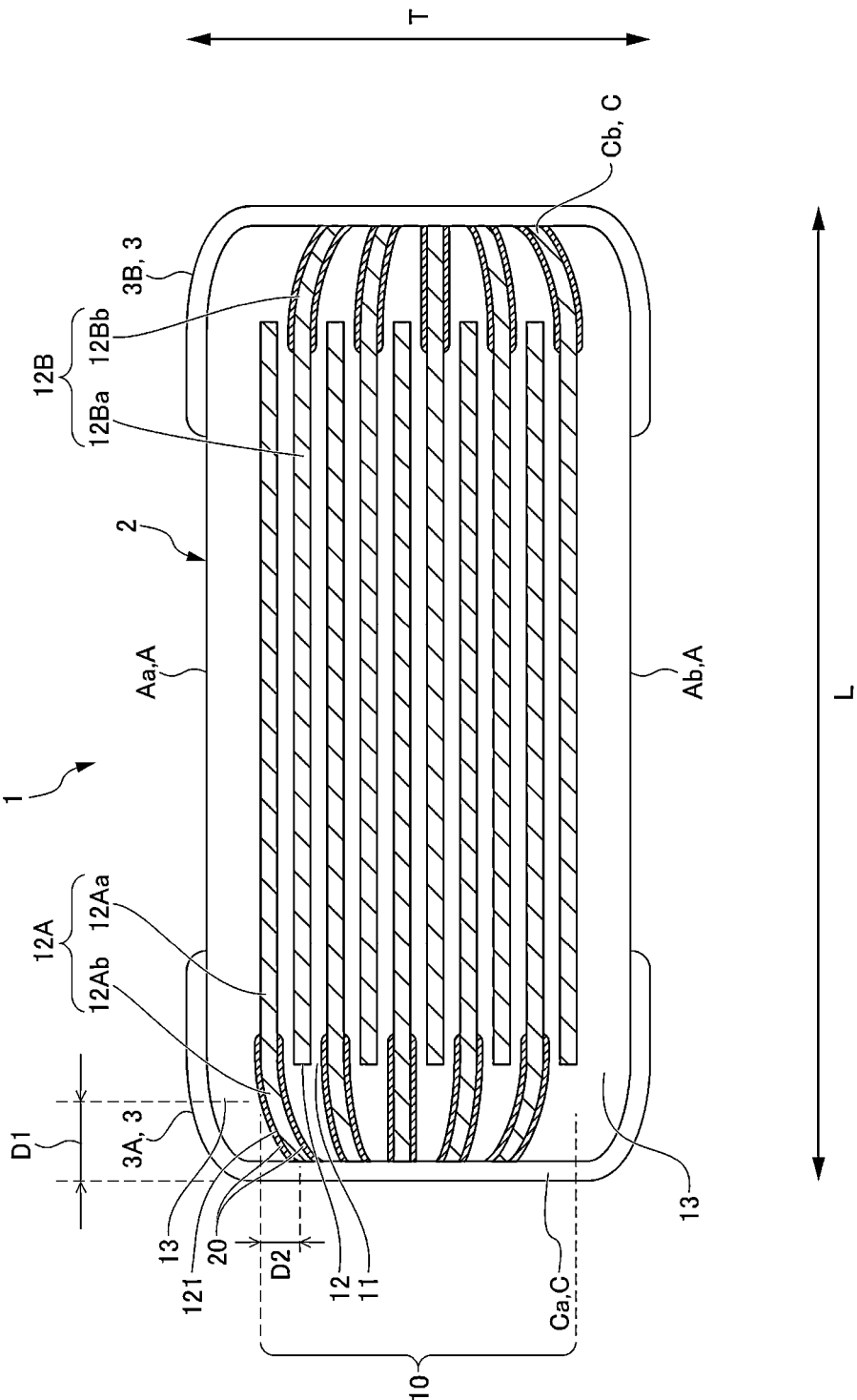
FIG. 2 is a sectional view of the section of the multilayer ceramic capacitor 1, taken along line II-II in FIG. 1.
Figure 3:
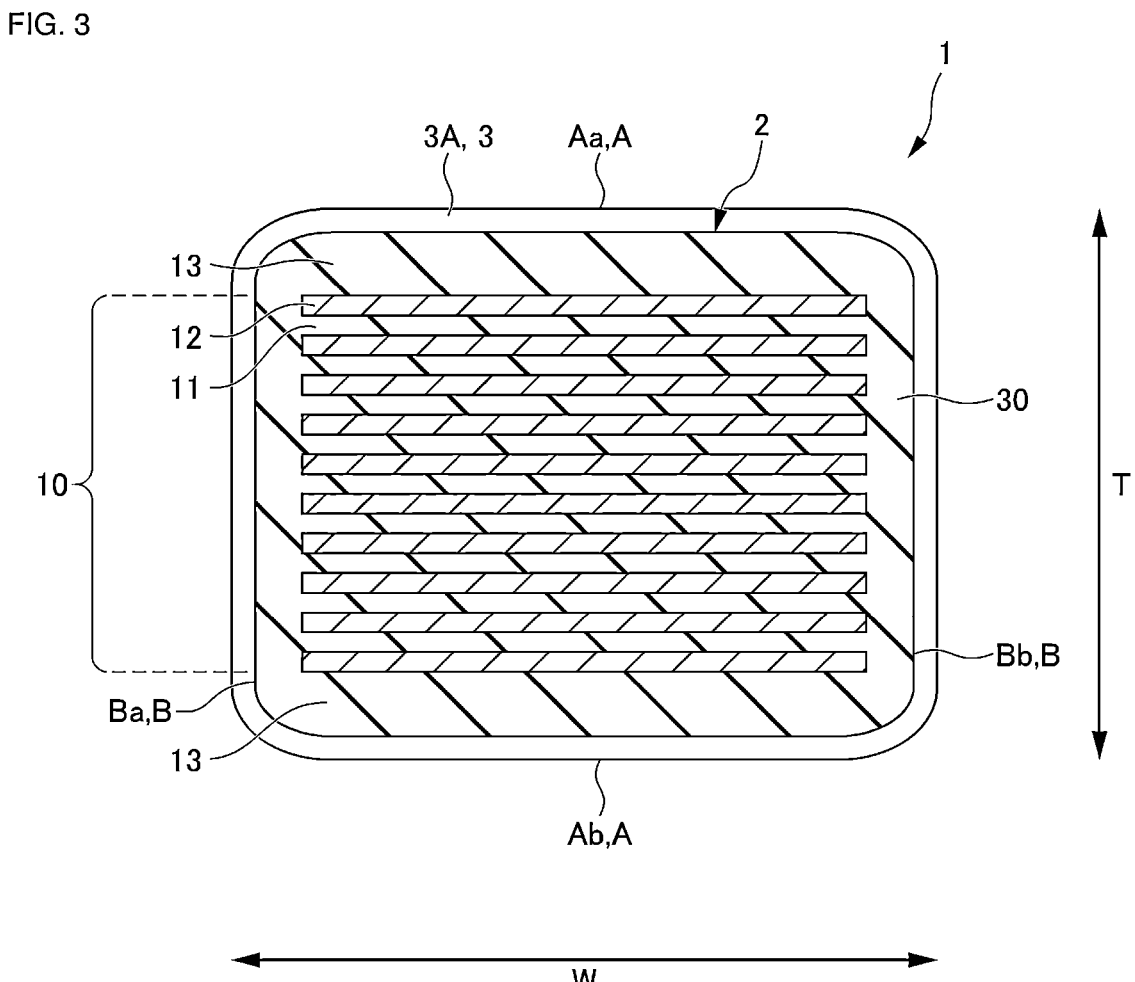
FIG. 3 is a sectional view of the section of the multilayer ceramic capacitor 1, taken along line III-III in FIG. 1.

A multilayer ceramic capacitor 1 according to an example embodiment of the present invention will be described below. FIG. 1 is a schematic perspective view of the multilayer ceramic capacitor 1 according to the present example embodiment. FIG. 2 is a sectional view of the section of the multilayer ceramic capacitor 1, taken along line II-II in FIG. 1. FIG. 3 is a sectional view of the section of the multilayer ceramic capacitor 1, taken along line III-III in FIG. 1.

The multilayer ceramic capacitor 1 includes a multilayer body 2 and a pair of outer electrodes 3 disposed at both ends of the multilayer body 2. The multilayer body 2 includes an inner layer portion 10 in which dielectric layers 11 and inner electrode layers 12 are alternately stacked.

In the following description, regarding terms indicating the direction of the multilayer ceramic capacitor 1, a direction in which the pair of outer electrodes 3 are disposed in the multilayer ceramic capacitor 1 is denoted by a length direction L. A direction in which the dielectric layers 11 and the inner electrode layers 12 are stacked is denoted by a stacking direction T. A direction intersecting both of the length direction L and the stacking direction T is denoted by a width direction W. In this regard, in the present example embodiment, the width direction W is orthogonal or substantially orthogonal to both of the length direction L and the stacking direction T. The stacking direction T is also referred to as a thickness direction.

The multilayer ceramic capacitor 1 has, for example, a withstand voltage of about 25 V. In addition, the multilayer ceramic capacitor 1 has a rectangular or substantially rectangular parallelepiped shape, the length direction L dimension is about 0.6 mm or more and about 3.2 mm or less, the width direction W dimension is about 0.3 mm or more and about 2.5 mm or less, and the thickness direction (stacking direction T) dimension is about 0.3 mm or more and about 2.5 mm or less, for example. Preferably, the multilayer ceramic capacitor 1 has 1005 size to 2012 size, the length direction L dimension is about 1.0 mm or more and about 2.0 mm or less, and the width direction W dimension and the thickness direction (stacking direction T) dimension are about 0.5 mm or more and about 1.25 mm or less, for example.

In this regard, in the following description, of six outer surfaces of the multilayer body 2, a pair of outer surfaces opposite to each other in the stacking direction T are denoted by a first principal surface Aa and a second principal surface Ab, a pair of outer surfaces opposite to each other in the width direction W are denoted by a first side surface Ba and a second side surface Bb, and a pair of outer surfaces opposite to each other in the length direction L are denoted by a first end surface Ca and a second end surface Cb. In this regard, when there is no need for different description between the first principal surface Aa and the second principal surface Ab, these are generically described as principal surface A, when there is no need for different description between the first side surface Ba and the second side surface Bb, these are generically described as side surface B, and when there is no need for different description between the first end surface Ca and the second end surface Cb, these are generically described as end surface C.

Multilayer Body 2

The multilayer body 2 includes an inner layer portion 10, outer layer portions 13 disposed on respective sides of the inner layer portion 10 in the stacking direction T, and side gap portions 30 disposed on both sides of the inner layer portion 10 and the outer layer portions 13 in the width direction W.

Inner Layer Portion 10

In the inner layer portion 10, the dielectric layers 11 and the inner electrode layers 12 are alternately stacked one by one.

Dielectric Layer 11

The dielectric layer 11 is produced by, for example, sintering a ceramic green sheet obtained by molding a slurry in which a binder, additives such as a plasticizer and a dispersing agent, and an organic solvent are added to a mixture into the shape of a sheet, where the mixture is produced by mixing a ceramic powder that is $BaTiO_3$, a glass component, and a sintering auxiliary added as the situation demands. The thickness of the dielectric layer 11 is, for example, about 0.8 μm or more and about 4.1 μm or less. In this regard, for example, the number of the dielectric layers 11 is 200 or more and 650 or less.

Inner Electrode Layer 12

The inner electrode layer 12 is produced, for example, by sintering an inner electrode layer paste containing a powder of a first metal component serving as a primary component, a binder, additives such as a plasticizer and a dispersing agent, an organic solvent, and the like. The first metal component as a primary component of the inner electrode layer 12 is, for example, Ni in the present example embodiment, and in the following description, the first metal component is assumed to be Ni.

The inner electrode layer 12 includes a plurality of first inner electrode layers 12A and a plurality of second inner electrode layers 12B. The first inner electrode layers 12A and the second inner electrode layers 12B are alternately provided. The thickness of the inner electrode layer 12 is, for example, about 0.5 μm or more and about 1.1 μm or less. In this regard, the number of the inner electrode layers 12 is, for example, 200 or more and 650 or less in total of the first inner electrode layers 12A and the second inner electrode layers 12B.

The first inner electrode layer 12A includes a first facing portion 12Aa opposing the second inner electrode layer 12B and a first extended portion 12Ab that extends from the first facing portion 12Aa to the first end surface Ca. An end portion of the first extended portion 12Ab is exposed at the first end surface Ca and is electrically coupled to the first outer electrode 3A described later.

The second inner electrode layer 12B includes a second facing portion 12Ba opposing the first inner electrode layer 12A and a second extended portion 12Bb that extends from the second facing portion 12Ba to the second end surface Cb. An end portion of the second extended portion 12Bb is electrically coupled to the second outer electrode 3B described later. Then, an electric charge is accumulated in the first facing portion 12Aa of the first inner electrode layer 12A and the second facing portion 12Ba of the second inner electrode layer 12B.

In this regard, when there is no need for different description between the first facing portion 12Aa and the second facing portion 12Ba, these are generically described as facing portion 12a, and when there is no need for different description between the first extended portion 12Ab and the second extended portion 12Bb, these are generically described as extended portion 12b.

Curved Portion 121

The extended portion 12b of the inner electrode layer 12 includes a curved portion 121. FIG. 2 illustrates a cross section that passes a central portion in the width direction W intersecting the stacking direction T and the length direction L and that extends in the stacking direction T and the length direction L. As illustrated in FIG. 2, the curved portion 121 is disposed in an end region nearer than a position a distance D1 from the end surface C to the end surface C. The curved portion 121 curves toward the central portion in the stacking direction T with increasing proximity to the end surface C from the facing portion 12a side. In this regard, the curve may include two or more inflection points or may include only one inflection point, and there is no particular limitation regarding the degree of inflection.

The inner electrode layer 12 in the central portion in the stacking direction T has the lowest degree of curving of the curved portion 121, and in the present example embodiment, the curved portion 121 of the inner electrode layer 12 at the center in the stacking direction T is a straight or substantially straight line. In this regard, the degree of curving of the curved portion 121 becomes higher with increasing proximity to the principal surface A. That is, the degree of curving of the curved portion 121 in the inner electrode layer 12 nearest to the principal surface A is the highest. In other words, the degree of curving of the curved portion 121 furthest from the central portion in the stacking direction T is the highest.

In the inner electrode layer 12 nearest to the principal surface A, a distance D2 between the position of the end-surface-C-side end portion of the curved portion 121 in the stacking direction T and the position of the facing portion 12a in the stacking direction T is, for example, about 3 μm or more and about 100 μm or less.

Solid Solution Layer 20

A solid solution layer 20 in which a first metal component that is, for example, Ni as a primary component of the inner electrode layer 12 defines a solid solution with a second metal component different from the first metal component is disposed at an interface to the dielectric layer 11 or the outer layer portion 13 on both sides of the curved portion 121 in the stacking direction T, where a mole ratio of the second metal component in a solid solution is about 0.001 or more and about 0.1 or less relative to a total amount of moles of the first metal component and the second metal component.

The second metal component is, for example, preferably Sn, In, Ga, Zn, Bi, Pb, Fe, V, Y, or Cu, the second metal component is, for example, Sn in the example embodiment, and in the following description, the second metal component is assumed to be Sn.

In this regard, for example, the solid solution layer 20 is a layer in which Ni atoms in a Ni atom arrangement structure are randomly substituted with Sn atoms while the Ni atom arrangement structure is maintained. The thickness of the solid solution layer 20 is, for example, preferably about 1 nm or more and about 20 nm or less. The solid solution layer 20 can be measured by subjecting ten points in a region including an interface between the dielectric layer 11 and the inner electrode layer 12 to measurement by TEM analysis. An averaged value of the ten points is used as the number of moles.

The solid solution layer 20 is disposed on the curved portion 121 of the inner electrode layer 12. In addition, in the example embodiment, the solid solution layer 20 further extends to the entire or substantially the entire extended portion 12Ab and extended portion 12Bb including the curved portions 121 and to regions within, for example, at least about 10 µm from the extended portion 12Ab side in the facing portion 12Aa and the extended portion 12Bb side in the facing portion 12Ba. In this regard, the solid solution layer 20 may be disposed on only the curved portion 121 of the inner electrode layer 12.

In addition, the solid solution layer 20 is disposed at interfaces to the dielectric layer 11 or the outer layer portion 13 on both sides of the curved portion 121 in the stacking direction T. However, the solid solution layer 20 is not limited to this and may be disposed on only one surface of the inner electrode layer 12 in the stacking direction T.

Further, in the present example embodiment, the solid solution layer 20 is disposed at interfaces to the dielectric layer 11 or the outer layer portion 13 on both sides of all of the inner electrode layers 12 in the stacking direction T. However, the solid solution layer 20 is not limited to this and may be disposed on only a portion of the inner electrode layers 12.

Outer Layer Portion 13

The outer layer portion 13 is disposed on both sides of the inner layer portion 10 in the stacking direction T and is made of the same dielectric ceramic material as the dielectric layer 11.

Side Gap Portion 30

The side gap portion 30 is disposed on both sides of the inner layer portion 10 and the outer layer portions 13 in the width direction W and is made of the same dielectric ceramic material as the dielectric layer 11.

Outer Electrode 3

The outer electrode 3 is disposed on both end surfaces C of the multilayer body 2. The outer electrode 3 covers not only the end surface C but also a portion of the principal surface A and the side surface B on the end surface C side.

As described above, the end portion of the first extended portion 12Ab of the first inner electrode layer 12A is exposed at the first end surface Ca and is electrically coupled to the first outer electrode 3A. In addition, the end portion of the second extended portion 12Bb of the second inner electrode layer 12B is exposed at the second end surface Cb and is electrically coupled to the second outer electrode 3B. Accordingly, in the structure between the first outer electrode 3A and the second outer electrode 3B, a plurality of capacitor elements are electrically coupled in parallel.

Production Step

Figure 4:
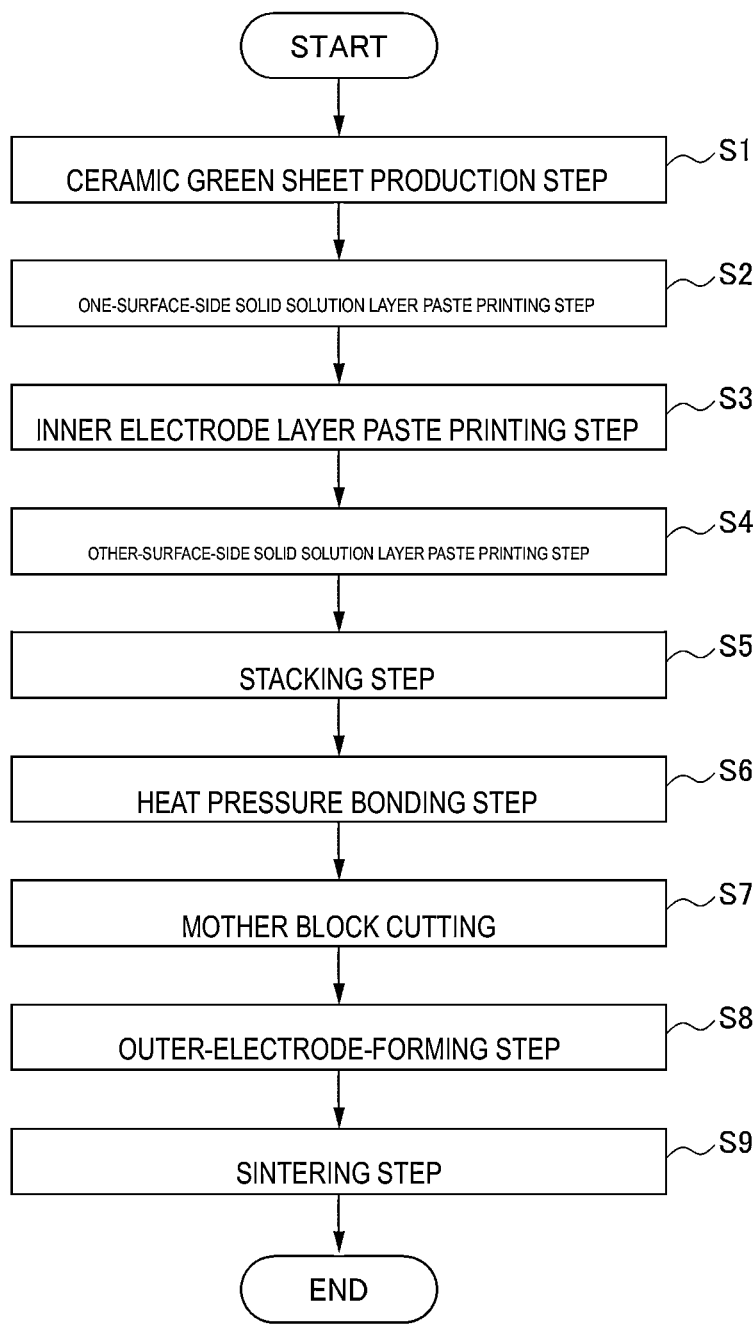
FIG. 4 is a flow chart illustrating an example of a method for manufacturing the multilayer ceramic capacitor 1.

FIG. 4 is a flow chart illustrating an example of a method for manufacturing the multilayer ceramic capacitor 1. In this regard, this manufacturing method is an exemplification, and the present invention is not limited to this. FIGS. 5A to 5D are diagrams illustrating steps of producing a multilayer sheet 103, described later, in the example method for manufacturing the multilayer ceramic capacitor 1. The steps of producing the multilayer sheet 103 are also an exemplification, and the present invention is not limited to this.

Ceramic Green Sheet Production Step S1

To begin with, a ceramic slurry containing a ceramic powder, a binder, and a solvent is prepared. An inner layer portion ceramic green sheet 101 illustrated in FIG. 5A is produced by the resulting ceramic slurry being printed into the shape of a sheet on a carrier film by using a die coater, a gravure coater, a microgravure coater, or the like, for example.

One-Surface-Side Solid Solution Layer Paste Printing Step S2

As illustrated in FIG. 5B, a solid solution layer paste 20P is printed in a region in which the curved portion 121 is to be formed on the surface of the inner layer portion ceramic green sheet 101.

Inner Electrode Layer Paste Printing Step S3

Next, as illustrated in FIG. 5C, an inner electrode layer paste 102 defining and functioning as the inner electrode layer 12 is printed in an inner electrode forming region P including a region in which the solid solution layer paste 20P is printed so that the curved portion 121 is to be formed.

Other-Surface-Side Solid Solution Layer Paste Printing Step S4

Further, the solid solution layer paste 20P is printed at the same or substantially the same position as the position at which the inner electrode layer paste 102 is printed in the one-surface-side solid solution layer paste printing step S2 on the surface of the inner electrode layer paste 102.

According to the steps described above, a multilayer sheet 103 is produced.

Stacking Step S5

Figure 6:
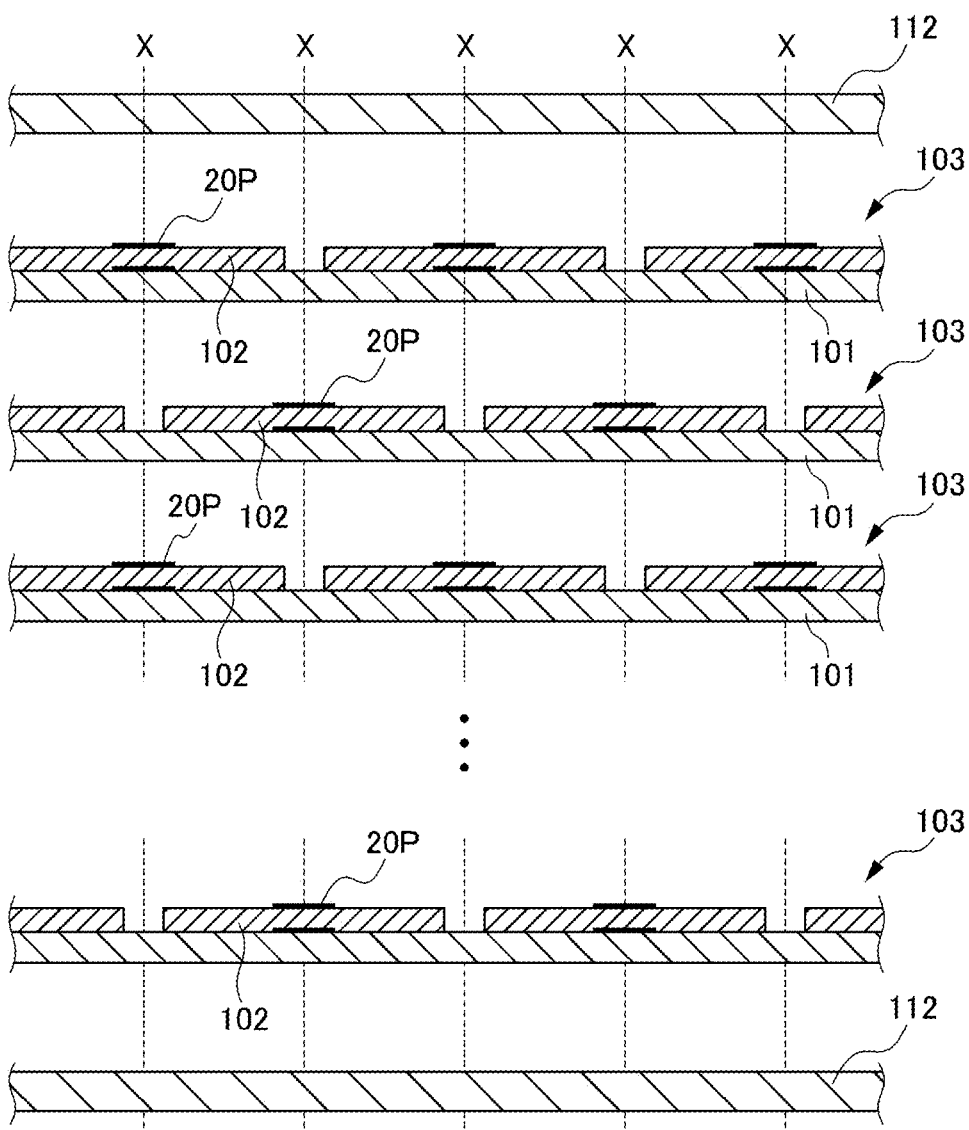
FIG. 6 is a diagram illustrating a stacking step in the method for manufacturing the multilayer ceramic capacitor 1.

Next, in the stacking step S5, a plurality of multilayer sheets 103 are stacked. FIG. 6 is a diagram illustrating the stacking step. As illustrated in the drawing, a plurality of multilayer sheets 103 are stacked so that the inner electrode forming regions P, in which the solid solution layer paste 20P and the inner electrode layer paste 102 are printed, of adjacent multilayer sheets 103 are shifted by a half-pitch from each other. Further, an outer layer portion ceramic green sheet 112 is stacked on both sides of the plurality of stacked multilayer sheets 103.

Heat Pressure Bonding Step S6

Subsequently, the outer layer portion ceramic green sheets 112 and the plurality of stacked multilayer sheets 103 are heat-pressure bonded. Accordingly, a mother block 110 is formed.

Mother Block Cutting Step S7

Thereafter, the mother block 110 is cut along a cut line X illustrated in FIG. 6 and a cut line intersecting the cut line X which correspond to the dimensions of the multilayer body 2. Accordingly, a plurality of multilayer bodies 2 are produced.

7

Formation of Curved Portion 121

Regarding the resulting multilayer body 2, an end region from the portion defining and functioning as the end surface C of the multilayer body 2 due to cutting along the cut line X to a position a certain distance from the end surface C in the length direction L is a region in which the extended portion 12*b* is to be formed, and portions of the multilayer sheets 103 on which the inner electrode layer paste 102 is printed and portions on which the inner electrode layer paste 102 is not printed are alternately stacked.

On the other hand, an inner region a certain distance or more spaced away from the end surface C is a region in which the facing portions 12*a* is to be formed, and only portions of the multilayer sheets 103 on which the inner electrode layer paste 102 is printed are stacked.

That is, the thickness in the stacking direction T of the region in which the extended portion 12*b* is disposed is smaller than the thickness of the inner region with increasing proximity to the end surface C since the number of layers of the inner electrode layer paste 102 is halved relative to the region in which the facing portion 12*a* is disposed. Consequently, the curved portion 121 that curves with increasing proximity to the end surface C is formed in the extended portion 12*b*.

Outer-Electrode-Forming Step S8

Next, the outer electrode 3 is formed on the thin end-surface-C-side portion of the multilayer body 2.

Firing Step S9

Subsequently, the multilayer body 2 provided with the outer electrode 3 is heated at a predetermined firing temperature for a predetermined time in a nitrogen atmosphere. Accordingly, the multilayer ceramic capacitor 1 is produced. In such an instance, the inner layer portion ceramic green sheet 101 and the outer layer portion ceramic green sheet 112 are sintered so as to become ceramic and to form the dielectric layer 11 and the outer layer portion 13. In the firing step S9, the inner electrode layer paste 102 becomes the inner electrode layer 12, and the solid solution layer paste 20P printed on both sides of the inner electrode layer paste 102 in the stacking direction T is heated so as to become the solid solution layer 20.

According to the present example embodiment described above, the following advantageous effects are provided.

The curved portion 121 is formed by the extended portion 12*b* being deformed in the stacking step S5 and the heat pressure bonding step S6 due to the plurality of multilayer sheets 103 being stacked and pressed. The strength of a portion of the extended portion 12*b* which is formed into the curved portion 121 may be deteriorated due to the deformation.

However, in the present example embodiment, the solid solution layer 20 is formed at interfaces on both surfaces of the curved portion 121 in the stacking direction T. Consequently, the strength of the curved portion 121 is improved, and the voltage resistance (withstand voltage) of the multilayer ceramic capacitor 1 is improved.

Further, a state (electric barrier height) in the vicinity of the interface to the dielectric layer 11 of the curved portion 121 is changed due to Ni and Sn forming a solid solution, and a high-temperature load life can be improved. Accordingly, the multilayer ceramic capacitor 1 having excellent reliability when a voltage is applied can be provided.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a multilayer body including a plurality of dielectric layers and a plurality of inner electrode layers alternately stacked; and
two outer electrodes on respective end surfaces located on both sides of the multilayer body in a length direction; wherein
the plurality of inner electrode layers include first inner electrode layers and second inner electrode layers that are alternately provided;
each of the first inner electrode layers includes a first facing portion opposing an adjacent one of the second inner electrode layers in a stacking direction and a first extended portion extending from the first facing portion to one of the end surfaces and is coupled to the outer electrode on the one of the end surfaces;
each of the second inner electrode layers includes a second facing portion and a second extended portion extending from the second facing portion to another of the end surfaces and is coupled to the outer electrode on the another of the end surfaces;
each of the first and second extended portions includes a curved portion that curves toward a center in the stacking direction with increasing proximity to the end surface from a respective first or second facing portion side;
a solid solution layer includes a first metal component as a primary component of the plurality of inner electrode layers and defines a solid solution with a second metal component different from the first metal component and is provided at an interface between the curved portion and the plurality of dielectric layers; and
in the solid solution layer, a mole ratio of the second metal component in the solid solution is about 0.001 or more and about 0.1 or less relative to a total amount of moles of the first metal component and the second metal component.

2. The electronic component according to claim 1, wherein the solid solution layer extends from the first and second extended portions including the curved portion to a region within at least about 10 μm from an extended-portion side in the respective first or second facing portion.

3. The electronic component according to claim 1, wherein a distance between a position of an end-surface-side end portion of the curved portion in the stacking direction and a position of the respective first or second facing portion in the stacking direction is about 3 μm or more and about 100 μm or less.

4. The electronic component according to claim 1, wherein a thickness of each of the plurality of inner electrode layers is about 0.5 μm or more and about 1.1 μm or less.

5. The electronic component according to claim 1, wherein the first metal component is Ni.

6. The electronic component according to claim 1, wherein the second metal component is Sn, In, Ga, Zn, Bi, Pb, Fe, V, Y, or Cu.

7. The electronic component according to claim 1, wherein a thickness of the solid solution layer is about 1 nm or more and about 20 nm or less.

8. The electronic component according to claim 1, wherein
a length-direction dimension is about 0.6 mm or more and about 3.2 mm or less;

a width-direction dimension is about 0.3 mm or more and about 2.5 mm or less; and a thickness-direction dimension is about 0.3 mm or more and about 2.5 mm or less.

9. The electronic component according to claim 1, wherein a length-direction dimension is about 1.0 mm or more and about 2.0 mm or less;

a width-direction dimension is about 0.5 mm or more and about 1.25 mm or less; and a thickness-direction dimension is about 0.5 mm or more and about 1.25 mm or less.

10. The electronic component according to claim 1, wherein a thickness of each of the plurality of dielectric layers is about 0.8 μm or more and about 4.1 μm or less.

11. The electronic component according to claim 1, wherein each of the plurality of dielectric layers includes BaTiO$_3$, a glass component, and a sintering auxiliary.

12. The electronic component according to claim 1, wherein a number of the plurality of dielectric layers is 200 or more and 650 or less.

13. The electronic component according to claim 1, wherein a number of the plurality of inner electrode layers is 200 or more and 650 or less.

14. The electronic component according to claim 6, wherein the second metal component is Sn.

15. The electronic component according to claim 1, wherein the solid solution layer extends to an entirety or substantially an entirety of each of the first and second extended portions.

16. The electronic component according to claim 1, wherein the solid solution layer is provided only on the curved portion.

17. The electronic component according to claim 1, wherein each of the two outer electrode extends to first and second principals and to first and second side surfaces of the multilayer body.

* * * * *